United States Patent [19]

Scheier et al.

[11] Patent Number: 4,564,977
[45] Date of Patent: Jan. 21, 1986

[54] POULTRY VENT REMOVAL MACHINE

[75] Inventors: Donald J. Scheier, Kansas City, Mo.; Jack L. Hathorn, Springdale, Ark.

[73] Assignee: Simon-Johnson, Inc., Kansas City, Kans.

[21] Appl. No.: 532,575

[22] Filed: Sep. 15, 1983

[51] Int. Cl.[4] ............................................ A22C 21/06
[52] U.S. Cl. ................................................... 17/11
[58] Field of Search ................................................ 17/11

[56] References Cited

U.S. PATENT DOCUMENTS

| | | | |
|---|---|---|---|
| 2,795,815 | 6/1957 | Dahlberg | 17/11 A |
| 3,147,513 | 9/1964 | Schneider et al. | 17/11 A |
| 3,705,440 | 12/1972 | Lewis | 17/11 A |
| 3,958,303 | 5/1976 | Scheier et al. | 17/11.1 R |
| 4,023,237 | 5/1977 | Meyn | 17/11 |
| 4,117,570 | 10/1978 | Meyn | 17/11 A |

Primary Examiner—Willie G. Abercrombie
Attorney, Agent, or Firm—Schmidt, Johnson, Hovey & Williams

[57] ABSTRACT

The two spindle machine has an innermost, elongated, vent-entering probe associated with one spindle and an elongated, cylindrical cutter associated with a second spindle concentrically receiving the probe. The probe may be telescoped into and out of the open end of the cutter, the latter having notched cutting teeth at the lower end thereof, so that, when extended, the probe and an enlargement at the lower end of the probe may be inserted into the vent opening. When the probe is partially retracted up into the cutter, cooperating, close-fitting surfaces between the latter and the probe grip the intestine and retain the same as the cutter is then rotated to sever the skin surrounding the vent; whereupon the probe and the cutter may be withdrawn together to likewise partially withdraw the intestine from the carcass. A suction port on the enlarged end of the probe assists the latter in retaining the intestine against escape during the operation, and the special notched teeth at the lower end of the cutter perform an effective severing action without removing excessive amounts of edible portions of the meat adjacent the vent opening.

11 Claims, 12 Drawing Figures

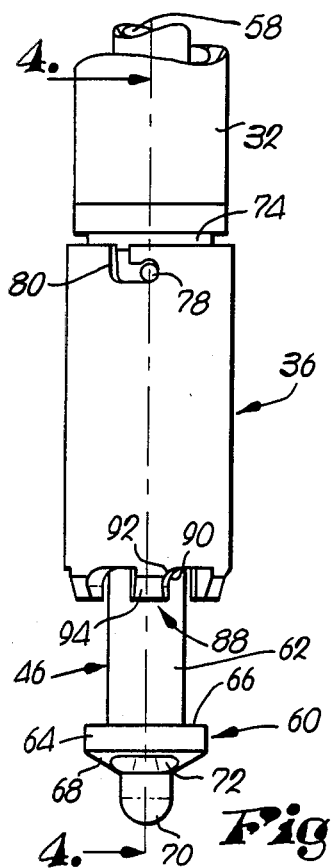
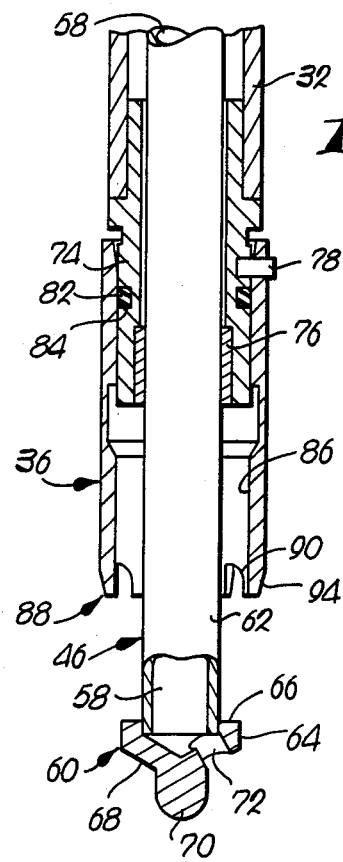
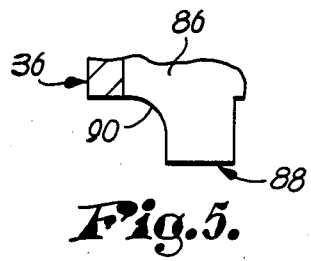
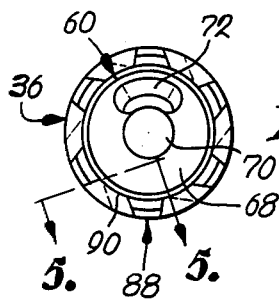
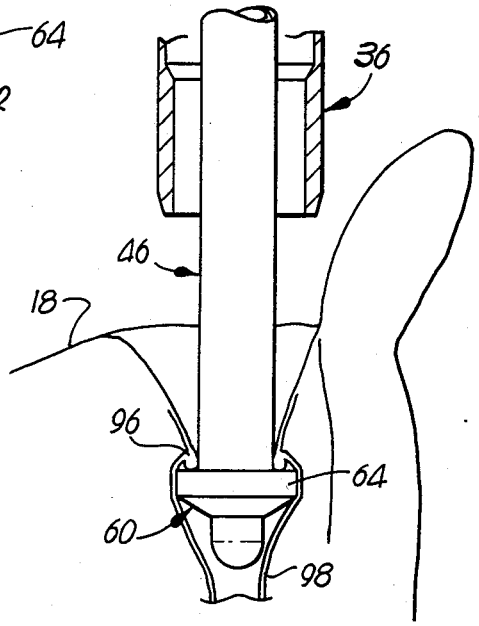
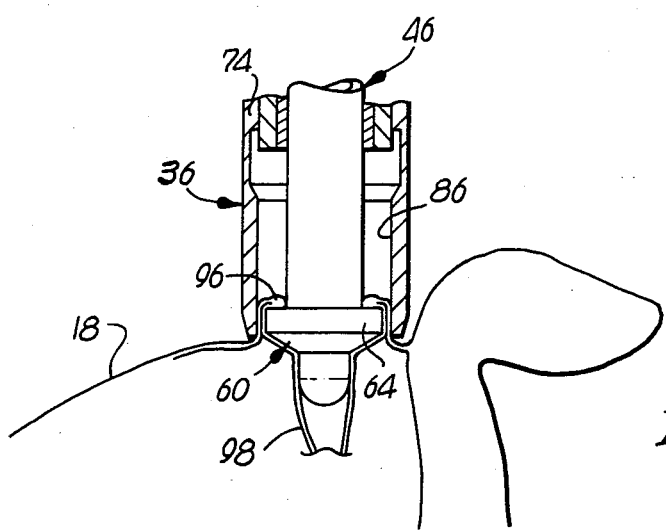

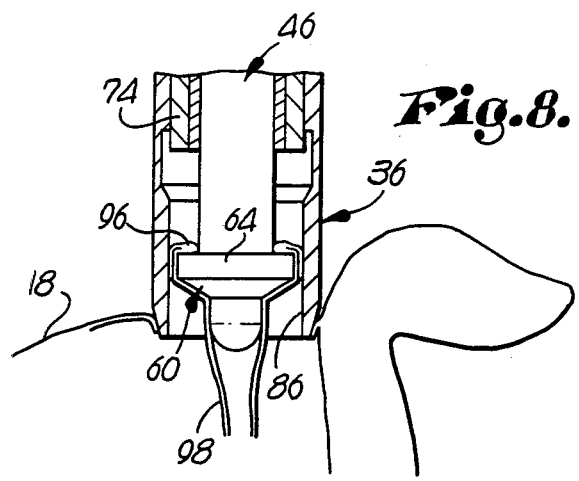
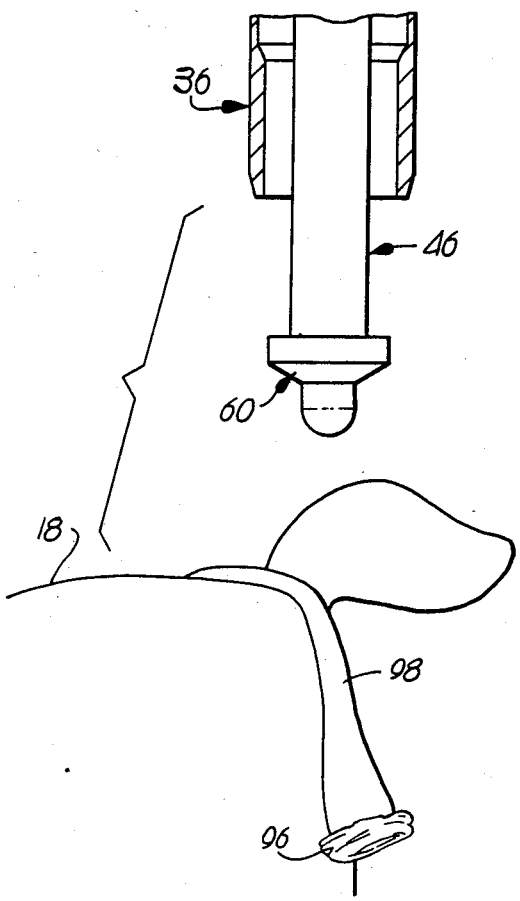
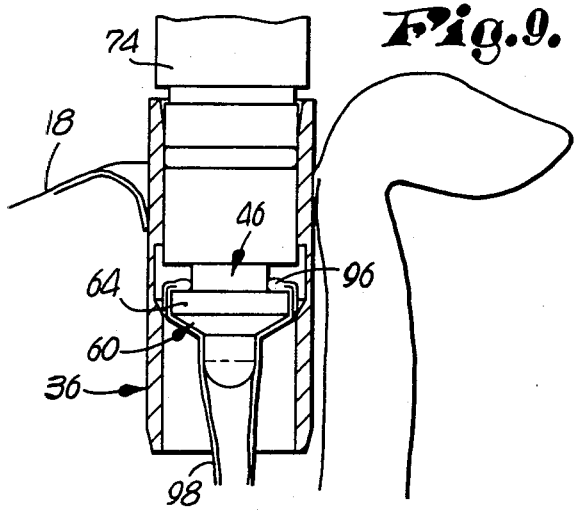
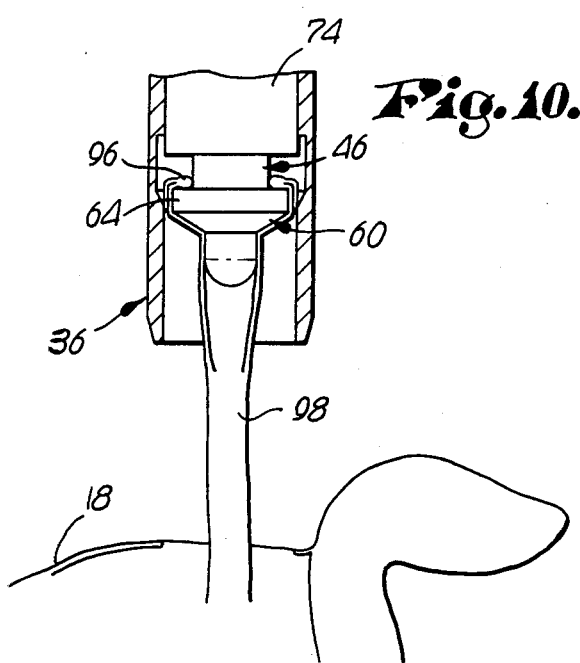
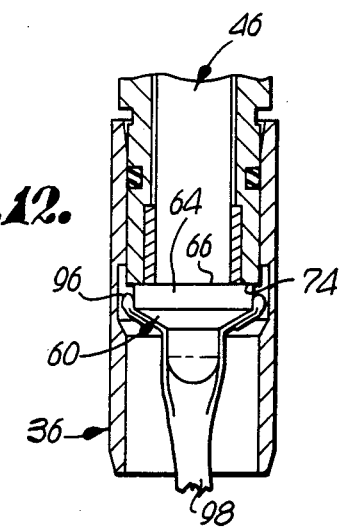

POULTRY VENT REMOVAL MACHINE

TECHNICAL FIELD

This invention relates to the evisceration of poultry carcasses and the like and, more particularly, to improvements in mechanisms for severing the vent from carcasses without damaging the entrails or removing excessive amounts of edible meat surrounding the vent opening.

BACKGROUND ART

U.S. Pat. No. 3,958,303 owned by the assignee of the present invention relates to a single spindle vent removing machine in which a centering probe on the spindle is inserted into the vent to such a depth that the lower circular cutting edge of a cylindrical cutter which coaxially houses the probe can engage the meat surrounding the vent. By then applying vacuum pressure within the cutter against the outside of the posterior of the carcass, the skin at that portion of the carcass tends to be drawn up into the cutter to facilitate severance by the then rotated circular cutting edge.

While the mechanism of the '303 patent has performed well in carrying out its intended function, in some instances it may cause larger than desirable amounts of edible meat to be left around the vent "plug" which results after the vent has been fully severed from the carcass. Thus, there is a need for a vent remover which will remove the vent as safely, thoroughly, and expeditiously as the mechanism in the '303 patent, yet which leaves more of the edible portions of the carcass behind as the vent plug is removed.

U.S. Pat. No. 4,023,237 in the name of Pieter Meyn shows a complicated three spindle vent removing machine.

SUMMARY OF THE PRESENT INVENTION

One important object of the present invention is to provide a vent cutter which is effective in removing the vent without damaging the entrails of the carcass yet which is not wasteful in terms of excessive amounts of edible meat left on the vent plug which will ultimately be discarded after inspection. To this end, the present invention contemplates having two coaxially disposed spindles on the machine, the inner of which comprises a centering and guiding probe which is telescopic with respect to the outer, cylindrical cutter of the second spindle. An enlargement at the lower end of the probe is thrust into the vent when the probe is extended from the cutter, and then when the probe is partially retracted up into the cutter, cooperating surfaces on the sides of the enlargement and the inner wall of the cutter grip and retain the intestine. This action remains effective throughout subsequent rotation of the cutter to sever the vent from the remainder of the carcass, whereupon the cutter and probe are withdrawn together away from the posterior of the carcass to string out the intestine and subsequently drape the same over the posterior of the carcass for inspection purposes. A vacuum port associated with the enlargement has the effect of drawing a vacuum inside the intestine whereby to adhere the latter to the probe and facilitate gripping thereof within the cutter during both retraction and severance, while special notched cutting teeth at the lower end of the cutter achieve effective severance while minimizing the edible meat left on the vent plug following its removal.

BRIEF DESCRIPTION OF THE DRAWINGS

FIG. 2 is an enlarged, fragmentary elevational view of the cutter and probe of the machine with the upper end portions thereof broken away;

FIG. 3 is a lower end plan view thereof;

FIG. 4 is a transverse longitudinal cross sectional view thereof taken substantially along line 4—4 of FIG. 2;

FIG. 5 is an enlarged, fragmentary cross sectional view of the lower end of the cutter illustrating details of construction of the cutting teeth thereof;

FIG. 6 is a schematic view of the cutter and probe in operation illustrating the probe just after the latter has entered the vent;

FIG. 7 shows the probe partially retracted up into the cutter with the intestine retained between the enlargement of the probe and the inner cylindrical surface of the cutter;

FIG. 8 illustrates the probe further retracted and the cutter rotating to sever the vent from the remainder of the carcass;

FIG. 9 shows the probe more fully retracted up into the cutter and with both components at their lowermost positions within the body cavity of the carcass;

FIG. 10 illustrates the cutter and probe fully retracted from the carcass with the retained intestine carried thereby;

FIG. 11 illustrates the probe projected from the cutter to release the intestine and drape the latter over the posterior of the carcass for inspection; and FIG. 12 shows the probe in its most fully retracted position relative to the cutter illustrating the way in which the intestine may be stripped from the enlarged lower end of the probe as the probe is drawn up to its upper limit of retracted travel.

DETAILED DESCRIPTION

Figure 1:
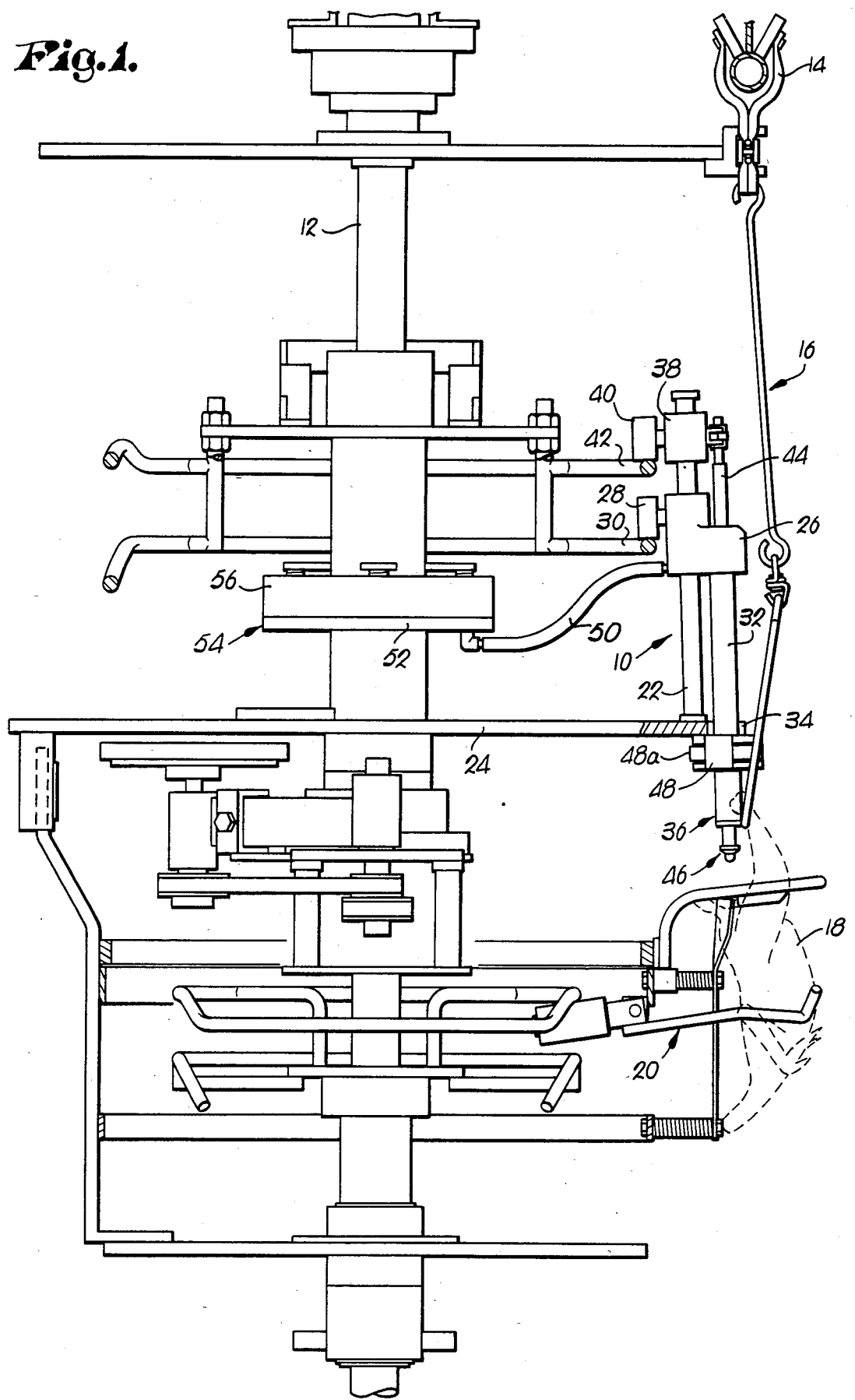
FIG. 1 is a fragmentary, somewhat schematic side elevational view of a vent cutting and removing machine constructed in accordance with the principles of the present invention, only one carcass processing station being illustrated on the machine in order to reveal details of construction most clearly.

With initial reference to FIG. 1, the vent cutting machine therein illustrated is of the carousel type in which a number of vent cutting units 10 (only one being shown) are mounted for rotation about a common vertical axis defined by an upright drive shaft 12. An overhead conveyor 14 provided with depending shackle assemblies 16 at spaced apart locations along the latter carry suspended poultry carcasses 18 or the like and intersect with the rotating machine at strategic points of conveyance so that carcass holding and positioning apparatus 20 at the lower end of the machine can receive and control the carcass during subsequent vent cutting operations. The conveyor 14 and machine are drive continuously, and after the cutting unit 10 has completed its full operation on the carcass after a prescribed amount of rotation of the machine, the conveyor 14 leads the carcass away from the machine toward the next processing location.

Each unit 10 includes an upright guide 22 rigidly affixed to a support plate 24 driven by the shaft 12 about the longitudinal axis of the latter, and a head 26 is freely reciprocable on the guide 22 as determined by a follower 28 which rides along a stationary cam track 30 laid out in a generally circular pattern about the axis of shaft 12. The head 26 supports a depending first spindle broadly denoted by the numeral 32 which projects downwardly through a clearance opening 34 in the plate 24, the head 26 also being provided with suitable bearing means not shown for journaling the spindle 32 for rotation about the longitudinal axis of the latter without axial shifting relative to the head 26. The lowermost end of the spindle 32 terminates in a cylindrical cutter 36, details of which will subsequently be described.

Each unit 10 further includes a second head 38 situated immediately above head 26 and likewise vertically reciprocable on the guide 22 to the extent determined by a follower 40 which rides along a stationary cam track 42 disposed about the axis of shaft 12. A second spindle 44 is affixed at its upper end to the upper head 38 and is telescopically received within the first spindle 32 in coaxial relationship therewith. The second spindle 44 terminates at its lower end in a probe 46, details of which will be hereinafter described.

The first spindle 32 passes through a drive assembly 48 secured to the underside of the plate 24 for travel with the latter, and it is the function of the drive assembly 48 to cause relatively high-speed rotation of the spindle 32 at strategic points during revolution of the machine. In this respect, a drive wheel 48a of the assembly 48 is disposed to periodically come into driving contact with suitable power input means (not shown) associated with the stationary portion of the machine to thereby rotate the spindle 32 and hence also the cutter 36. In a similar way, a hose 50 connects the head 26 with one part 52 of a vacuum supply valve broadly denoted by the numeral 54 on the center axis of the machine. Part 52 rotates with the unit 10 whereas a second part 56 of valve 54 is stationary and is in the nature of a supply manifold which is periodically communicated with the hose 50 to draw a vacuum thereon at strategic points in the rotation of the unit 10. Internal porting (not shown) within the head 26 disposes the latter in open communication with the interior of the spindle 44 which has a vacuum passage 58 therein as illustrated, for example, in FIG. 4.

With continued reference to FIG. 4, for example, it may be seen that the probe 46 at the lower end of the spindle 44 has an enlargement 60 of increased diameter relative to the primary, tubular shank portion 62 of the probe 46. The enlargement 60 has a radially outermost circumferential surface 64 which extends in parallel relationship with the longitudinal axis of shank portion 62, and a radially outwardly extending shoulder 66 facing upwardly away from the lower end of enlargement 60 extends between the surface 64 on the one hand and the shank portion 62 on the other hand. The enlargement 60 is also provided with a frusto-conical surface 68 below the outermost surface 64 and tapering inwardly to a domed, lowermost tip 70 of the probe 46. A port 72 in frusto-conical surface 68 communicates with the interior vacuum passage 58.

As seen perhaps most clearly in FIGS. 2 and 4, the spindle 32 includes a tubular mounting portion 74 having an internal bushing 76 circumscribing the shank portion 62 of the probe 46. Mounting portion 74 is provided with a short, radially outwardly projecting pin 78 forming a part of a bayonet-type mounting system by which the cutter 36 may be quickly and easily attached to and detached from the mounting portion 74. In this respect it will be noted from FIG. 2 that the cutter 36 is provided with a generally L-shaped, pin-receiving slot 80 at the upper end extremity thereof. An O-ring 32 is received within a continuous circumferential groove 34 in the mounting portion 74 and is compressed between the cutter 36 and the mounting portion 74 when the cutter 36 is properly affixed in place by the bayonet pin-and-slot arrangement 78, 80.

The cutter 36 is provided with an interior wall or surface 86 which extends parallel to the longitudinal axis of the probe 46 and thus also to the surface 64 of the enlargement 60. As may be noted from certain of the diagrammatic views, (FIGS. 6–12), the interior surface 86 of the cutter 36 is disposed in closely spaced relationship to the surface 64 of enlargement 60 when the probe 46 is retracted up into the cutter 36.

Cutting means are located at the lower end extremity of the cutter 36 and take the form of a circumferentially extending series of notched cutting teeth 88. Each tooth 88 has an arcuate cutting edge 90 which is in leading relationship to the remainder of the tooth with respect to the direction of rotation of the cutter 36 during operation, and a bevel 92 of generally concave configuration slopes radially outwardly away from such edge 90. Each tooth 88 is also provided with a chamfer 94 on the exterior thereof which slopes radially inwardly as the lowermost end extremity of the tooth is approached.

OPERATION

With the carcass 18 controlled by the holding apparatus 20, the probe 46 is thrust downwardly into the vent 96 as illustrated in FIG. 6 such that the enlargement 60 enters the intestine 98. At this time, there is vacuum pressure to the port 72 of the enlargement 60 so that the intestine 98 tends to become adhered to the enlargement 60. The cutter 36 is not rotating.

As the machine continues to rotate and the followers 28, 40 ride along their respective cam tracks, 30, 42, the cutter 36 lowers to the position of FIG. 7 as the probe 46 withdraws up into the cutter 36, pulling the intestine 98 with it. The vacuum remains on at this time, while the cutter 36 remains non-rotating. As illustrated in FIG. 7, due to the close fitting relationship between the parallel surfaces 64 and 86 of the enlargement 60 and cutter 36 respectively, the intestine and adjacent area of the vent become gripped between the enlargement 60 and the interior of the cutter 36 to retain the intestine 98 against escape. The vacuum remains on at this time.

Thereafter, as shown in FIG. 8, the probe 46 continues to retract within the cutter 36 and the latter commences rotation, thereby severing the skin around the vent and cutting through the meat that exists in that vicinity. The vacuum remains on to assist the probe 46 in keeping the intestine 98 retained on the enlargement 60.

The rotating cutter 36 continues its downward movement into the body cavity of the carcass until, prior to reaching its lowermost position of FIG. 9, rotation ceases. By this time, the probe 46 has been retracted even further up into the cutter 36 and the vacuum remains on. The cutter 36 and probe 46 are then withdrawn from the body cavity in unison without additional rotation of the cutter 36 so that the intestine 98 is pulled upwardly and out of the cavity in the manner illustrated in FIG. 10.

Upon reaching the highest point of withdrawal, the vacuum is shut off to the probe 46 and the carcass 18 is moved slightly laterally relative to the cutting unit 10 such that, when the probe 46 is telescoped outwardly from the cutter 36 as illustrated in FIG. 11, the intestine 98 is released and caused to drape over the posterior of the carcass 18 in the manner therein illustrated. The carcass 18 is thereafter conveyed on to the next processing site and the cutting unit 10 completes its 360-degree cycle and returns for the next carcass to be processed.

FIG. 12 is illustrative of the fact that after the probe 46 and the cutter 36 have been withdrawn as illustrated in FIG. 10, the probe 46 is caused to move through a short additional retraction movement causing the shoulder 66 to come into temporary abutment against the lower extremity of the mounting portion 74 of the spindle 44. This results in squeezing the intestine 98 off the enlargement 60, which action can be especially beneficial in the event that the intestine 98 has accidentally been torn during the withdrawing action and cannot by virtue of its tensioned connection with organs remaining in the cavity pull itself off the enlargement 60.

I claim:

1. In a machine for severing the vent from a poultry carcass or the like, the improvement comprising:
    an elongated probe adapted for entering the vent and intestine of a carcass to be processed;
    a generally cylindrical cutter coaxially receiving said probe and having cutting means adjacent one end extremity;
    means for rotating said cutter relative to the probe about the common axis of the probe and cutter;
    means for relatively telescoping said probe and the cutter such that the probe is alternately projected outwardly from said cutter beyond said cutting means and withdrawn into the cutter to a retracted position relative to the cutting means; and
    means for controlling said relative telescopic and rotary movements of the probe and cutter such that the probe enters the intestine when the probe is in its projected position, the probe pulls the end portion of the intestine into the cutter during relative retraction of the probe, and the cutter thereupon rotates while the probe is in its retracted position whereby to sever the skin surrounding the vent from the remainder of the carcass,
    said probe having an enlargement at the intestine-engaging end thereof provided with a radially outermost, longitudinally extending surface disposed in closely spaced, mutually opposed relationship with the proximal inner surface of the cutter when the probe is in its retracted position,
    said surfaces extending in substantial parallelism with one another and being operable to forcibly grip the intestine therebetween and thereby retain the same on the probe during rotation and severance by the cutter.

2. In a machine as claimed in claim 1, wherein said probe has a primary shank portion of reduced diameter relative to said enlargement, said enlargement having a radially outwardly extending shoulder extending between the shank portion and said longitudinally extending surface and intersecting the latter at substantially right angles therewith.

3. In a machine as claimed in claim 2, wherein said probe is further provided with a leading tip of reduced diameter relative to said enlargement, said enlargement having a generally frusto-conical surface tapering from said longitudinal surface to the tip.

4. In a machine as claimed in claim 3, wherein said probe is provided with an internal passage adapted for connection with a source of vacuum pressure, said passage having a port located in said frusto-conical surface of the enlargement for assisting in retaining the intestine on the probe during operation.

5. In a machine as claimed in claim 1, wherein said probe is provided with an internal passage adapted for connection with a source of vacuum pressure, said passage having a port located adjacent said intestine-engaging end of the probe for assisting in retaining the intestine on the probe during operation.

6. In a machine as claimed in claim 1, wherein said cutting means includes means defining a plurality of notched teeth having longitudinally extending cutting edges and endmost, transversely extending, blunt surfaces, said cutting edges being disposed on the leading extremities of said teeth with respect to the direction of rotation of the cutter.

7. In a machine as claimed in claim 6, wherein each of said teeth has a bevel along said leading extremity thereof sloping to said cutting edge, each of said bevels being generally concave.

8. In a machine as claimed in claim 7, wherein each of said teeth is further provided with a chamfer on the radial exterior thereof at the proximal longitudinal extremity of the cutter.

9. In a machine for severing the vent from a poultry carcass or the like, the improvement comprising:
    an elongated probe adapted for entering the vent opening of a carcass to be processed;
    a generally cylindrical cutter coaxially receiving said probe and having cutting means adjacent one end extremity;
    means for rotating said cutter relative to the probe about the common axis of the cutter and probe;
    means for relatively telescoping said probe and the cutter such that the probe is alternately projected outwardly from said cutter beyond said cutting means and withdrawn into the cutter to a retracted position relative to the cutting means; and
    means for controlling said relative telescopic and rotary movements of the probe and cutter such that the probe enters the intestine when the probe is in its projected position, the probe pulls the end portion of the tract into the cutter during relative retraction of the probe, and the cutter thereupon rotates while the probe is in its retracted position whereby to sever the skin surrounding the vent opening from the remainder of the carcass,
    said cutting means including means defining a plurality of notched teeth having longitudinally extending, cutting edges and endmost, transversely extending, blunt surfaces, said cutting edges being disposed on the leading extremities of said teeth with respect to the direction of rotation of the cutter.

10. In a machine as claimed in claim 9, wherein each of said teeth has a bevel along said leading extremity thereof sloping to said cutting edge, each of said bevels being generally concave.

11. In a machine as claimed in claim 10, wherein each of said teeth is further provided with a chamfer on the radial exterior thereof at the proximal longitudinal extremity of the cutter.

* * * * *